United States Patent Office 2,834,759
Patented May 13, 1958

2,834,759

WATER SOLUBLE COPOLYMERS OF VINYL ACETATE AND ALLYL SULFONIC ACID SALTS AND PROCESS FOR PRODUCING SAME

Paul R. Austin, Wilmington, Del., assignor to E. I. du Pont de Nemours and Company, Wilmington, Del., a corporation of Delaware No Drawing. Application July 8, 1954
Serial No. 442,201

8 Claims. (Cl. 260—79.3)

This invention relates to the production of new copolymers and, more particularly, it relates to the production of hydrophilic copolymers of a vinyl ester of a carboxylic acid and a 3–4 carbon allylic sulfonic acid and salts thereof.

It is an object of this invention to produce a water soluble copolymer of predominantly recurring vinyl carboxylic acid ester groups. It is another object of this invention to produce a water-soluble copolymer containing recurring vinyl carboxylic acid ester or vinyl alcohol groups and recurring methylene sulfonic acid groups.

It has now been found that highly desirable, water-soluble textile sizing agents can be obtained by copolymerizing a vinyl ester of a carboxylic acid, for example, vinyl acetate, vinyl formate, vinyl propionate, or vinyl butyrate, with a salt of a 3–4 carbon allylic sulfonic acid. Such copolymers may be obtained by the copolymerization of these materials in a ratio of vinyl ester to allylic sulfonate of between 65:35 and 97:3.[1]

The new copolymers of this invention may be represented by the following structural formula:

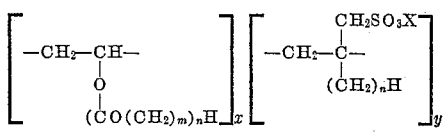

wherein $n$ is zero or one, $m$ is a cardinal number of zero to three, X is a cation such as an alkali metal, and $x$ is greater than $y$, with the ratio of $x:y$ generally varying between 65:35 and 97:3. A particularly preferred embodiment of this invention is the vinyl acetate/sodium 2-methyl-2-propenesulfonate copolymer of molar ratio of between 80:20 and 95:5.

These copolymers may be readily hydrolyzed by alkaline or acid hydrolysis in the common procedures for the hydrolysis of polyvinyl acetate to substitute hydroxyl groups for the organic acid ester groups. Such hydrolyzed copolymers are water-soluble to a high degree.

The following examples, in which parts are by weight unless otherwise specified, further illustrate this invention.

Example I

A mixture of 150 parts of distilled vinyl acetate, 15 parts of sodium 2-methyl-2-propenesulfonate, 120 parts of ethyl alcohol and 0.3 part of alpha,alpha'-azodiisobutyronitrile was heated under reflux for six hours, allowed to stand for twelve hours at room temperature, and then steamed to remove ethyl alcohol and excess vinyl acetate. Evaporation of the resultant hot aqueous solution yielded 123 parts of a brittle, solid polymer. The product was completely soluble in methanol, acetone, and hot water.

[1] The salt of the allylic sulfonic acid for use in the present invention may be prepared from allyl chloride or methallyl chloride and sodium sulfite by the method previously used for the preparation of sodium 2-bromoethanesulfonate as disclosed in "Organic Syntheses," Coll. Vol. II, John Wiley & Sons, Inc., New York, 1943, p. 558.

In cold water a faintly opalescent dispersion was formed. The inherent viscosity of the product was 0.10 measured at 0.5% concentration in methanol. A sulfur content of 2.02% indicated a molar composition of about 94 vinyl acetate units to 6 units of sodium 2-methyl-2-propenesulfonate or an 88/12 weight ratio of components. That this material was a true copolymer was indicated by the fact that the composition did not change when an aqueous solution of the product was subjected to dialysis through a cellophane membrane. The sulfur content of the dialyzed material was 2.06%.

Example II

A mixture of 150 parts of distilled vinyl acetate, 15 parts of sodium 2-propenesulfonate, 120 parts of methanol, and 0.3 parts of alpha,alpha'-azodiisobutyronitrile was heated under reflux for three hours, allowed to stand overnight, and then steamed. The resultant aqueous dispersion was evaporated at reduced pressure to give a slightly damp residue which was then triturated with about 325 parts of acetone. After separation from insoluble material, the acetone solution was evaporated to give 45 parts of a brittle, water-sensitive resin, which was found by analysis to contain 3.93% sulfur and to have an inherent viscosity of 0.10 in 0.5% solution in methanol. The product yielded hazy solutions in water. Calculation of the composition from the sulfur content indicated the presence of 18% sodium 2-propenesulfonate in the product (corresponding molar ratio of vinyl acetate to 2-propenesulfonate of 88.5 to 11.5).

A solution of 15 parts of the above polymer in 200 parts of methanol to which a small piece of metallic sodium had been added was heated under reflux for two hours, then cooled and filtered. The residue thus obtained was triturated twice in methanol and then dried at 70° C. in a vacuum oven to give a white, powdery product which was readily soluble in water. An aqueous solution of 0.5% concentration had an inherent viscosity of 0.17. Compositional analysis indicated the presence of 10–13% sodium 2-propenesulfonate in the polymer. The saponified product contained less propenesulfonate residues than the unsaponified due to fractionation during hydrolysis (methanolysis). The product was a vinyl alcohol/sodium 2-propenesulfonate copolymer.

Example III

A mixture of 150 parts of vinyl acetate, 25 parts of sodium 2-methyl-2-propenesulfonate, 250 parts of methanol and 0.3 part of alpha,alpha'-azodiisobutyronitrile was heated under reflux for four hours and then subjected to steaming to remove unreacted vinyl acetate and methanol. Evaporation of the resultant aqueous solution gave 62 parts of a white, water-soluble resin which contained 6.6% sulfur equivalent to 33% of sodium 2-methyl-2-propenesulfonate (corresponding to a mole ratio of about 80/20 of vinyl acetate/sodium 2-methyl-2-propenesulfonate).

Example IV

A mixture of 60 parts of sodium 2-methyl-2-propenesulfonate, 600 parts of vinyl acetate, 100 parts of water, 630 parts of t.-butyl alcohol, and 1.2 parts of alpha,alpha'-azodiisobutyronitrile was heated under reflux for 8.6 hours and then steamed to remove volatile components. The resultant aqueous solution was evaporated to dryness to give 419 parts of brittle, glassy resin which was completely soluble in water. The product contained 2.7% of sulfur, indicating that the polymer contained 13.4% sodium 2-methyl-2-propenesulfonate (corresponding to an approximate mole ratio of 92/8 of vinyl acetate/sodium 2-methyl-2-propenesulfonate).

The product of the example is of particular utility as a textile sizing agent.

Example V

A mixture of 150 parts of vinyl acetate, 5 parts of sodium 2-methyl-2-propenesulfonate, 160 parts of t.-butyl alcohol, 25 parts of boiled, distilled water and 0.3 part of alpha,alpha'-azodiisobutyronitrile was heated under reflux for eight hours and then subjected to steaming. The aqueous residue did not dissolve entirely in this amount of water since some tacky material adhered to the sides of the flask. This material was readily washed off with water. Evaporation of the aqueous dispersion at 125° C. and reduced pressure yielded 124 parts of a product which was insoluble in cold water but was readily dispersed in warm water. The sulfur analysis indicated the presence of 3.6% of the sulfonate monomer in the copolymer (corresponding to a mole ratio of about 98/2 of vinyl acetate/sodium 2-methyl-2-propenesulfonate).

Example VI

A mixture of 182 parts of an 86/14 (on a molar basis) vinyl acetate/sodium 2-methyl-2-propenesulfonate copolymer, 75 parts of sodium hydroxide and 600 parts of water was heated under reflux for eight hours and then cooled. Acetic acid was added to neutralize the solution, very little being required. The solution was evaporated to dryness, then diluted in water and allowed to dialyze through a cellophane membrane. Dialysis was carried on for fourteen days and then the dark brown solution was concentrated by distillation and reduced pressure. The residue after drying at 50° C. was 63 parts of dark brown, brittle lumps which contained 2.6% sulfur and had a saponification number of about 17. The inherent viscosity of a 0.1% solution in water was 0.18. The original ester copolymer had contained 2.9% sulfur and had a viscosity of 0.11. The difference in viscosity and weight loss as well as sulfur content indicated the loss of low molecular weight fractions occurred during the saponification and purification.

Example VII

A mixture of 90 parts of 95% ethanol, 10 parts of water, 42.5 parts of vinyl acetate, and 5 parts of sodium 2-propene sulfonate was heated with agitation under a nitrogen atmosphere. When the reflux temperature was reached, 5 parts of "extract catalyst"[2] (containing 0.07 part of active oxygen as acetyl peroxide), was added. Heating and stirring were continued for one hundred and seventy minutes, during which period an additional 5 parts of "extract catalyst" was added in small portions. The reflux temperature rose from 68.2 to 72.1° C. during this period. One-tenth of a part of thiourea was then added as a shortstop and residual vinyl acetate, ethanol, and water were recovered by distillation. Final traces of volatile materials were removed by drying the resinous product in a vacuum oven at 50° C. A brittle, sponge-like, colorless product was obtained. The product was readily soluble in water.

Example VIII

A mixture of 100 parts of methanol, 95 parts of vinyl acetate, and 5 parts of sodium 2-propenesulfonate was heated to the reflux temperature with stirring under a nitrogen atmosphere. Three-tenths of a part of alpha,-alpha'-azodiisobutyronitrile was added and heating and stirring were continued for ninety minutes. An additional 0.1 part of initiator was added and the reaction was continued for another one hundred and fifty-three minutes. During this period the temperature of the refluxing vapors rose from 57.9 to 61.9° C. Unpolymerized vinyl acetate and methanol were removed over a steam bath and the syrupy resin obtained was then dried overnight in a vacuum oven at 50–55° C. Seventy-two parts of a colorless, brittle resin which was readily soluble in water was obtained.

In the structural formula above set forth, vinyl formate, vinyl acetate, vinyl propionate, and vinyl butyrate recurring units are represented by values of $n$ of one in the left portion of the formula and of $m$ of from zero to three. The recurring unit of vinyl alcohol, i. e., the hydrolyzed product, is realized when $n$ is zero. In the allylic sulfonic acid salt portion (right side of formula as represented above), when $n$ is zero, the recurring unit is that of a 2-propenesulfonate while for $n$ equals one the unit is that of a 2-methyl-2-propenylsulfonate.

The cation, X, is generally that of an alkali metal, alkaline earth metal, or an ammonium salt. The cation is one suitably such that the copolymer containing the sulfonate group is water soluble, generally of a molecular weight of less than 100. In place of the salts, such as sodium, potassium, or magnesium, the copolymer can be obtained in the form of the free sulfonic acid by acidification.

Particularly preferred are the copolymers of vinyl acetate with sodium 2-methyl-2-propenesulfonate. The molecular weight of the copolymer is generally above 4000 although copolymers having a lower molecular weight are useful, providing the amount of allylic sulfonic acid salt is sufficient to average at least one sulfonate group per molecule. Products having a molecular weight of the order of 1000 to 40,000 are embraced by this invention with those of molecular weight of 4,000 to 30,000 generally preferred. The inherent viscosity of the copolymers is usually 0.05 to 0.3.

When the vinyl ester/allylic sulfonic acid salt copolymer is subjected to hydrolysis (including alcoholysis), the vinyl ester unit is converted to a vinyl alcohol unit. The hydrolyzed products have increased solubility in water. These copolymers contain both hydroxyl groups and methylene-sulfonic acid ($-CH_2SO_3-$) groups attached to separate carbons of the polymer chain. These hydrolyzed products have particular utility as leather treating agents.

In the copolymers and their hydrolyzed products, decreased sulfonate content usually results in increased hardness of films prepared from the copolymers. The copolymers themselves are either water-dispersible or water-soluble. With sulfonate monomer content of 8–12% or more, the copolymers are readily soluble in cold water. With low sulfonate content, e. g., 3–5%, the copolymers are easily dispersed in water and generally soluble in hot water.

In the polymerization, the ratio of monomeric allylic sulfonic acid salt to vinyl ester is substantially that desired in the resulting copolymer. It is usually advantageous to employ slightly less of the sulfonate monomer than desired in the copolymer since the allylic compound polymerizes with vinyl esters at a rate slightly higher than that for the vinyl ester and hence the copolymer generally contains more of the sulfonate than present in the polymerizing mixture.

The polymerization is usually effected in an homogeneous system, preferably in the presence of water or alcohol or other solvents inert to the reactants such as used in the solvent polymerization of vinyl acetate. The polymerization is initiated by a free-radical generating catalyst, e. g., a peroxy catalyst such as benzoyl peroxide or ammonium persulfate, including combinations of a peroxide with a reducing agent. Azonitrile catalysts of the type described in Hunt U. S. Patent No. 2,471,959 are particularly useful initiators. The time and temperature of polymerization are interdependent variables and are generally selected with regard to the temperature chosen and the activity of the initiator at this temperature. The polymerizations are usually carried out at a

---

[2] A solution of acetyl peroxide in vinyl acetate, prepared by shaking together at 0–5° C. equal volumes of a saturated aqueous solution of sodium perborate and vinyl acetate, followed by decantation of the organic layer.

temperature of 20–100° C. for times of two to twenty-four hours or longer.

The copolymers are water soluble or dispersible and obtained in a relatively pure form by removal of monomers by evaporation of volatile materials and by precipitation and washing with organic non-solvents. Since they are of relatively high molecular weight, they do not pass dialytic membranes and dialylsis is employed to remove low molecular weight contaminants.

The copolymers and the hydrolyzed copolymers are useful in textile applications, e. g., as sizing materials for synthetic fibers. By reason of the water solubility of these copolymers, they can be used to adhere filaments to each other for textile operations after which they can be readily washed off with water. They are also useful as leather treating agents, adhesives, films, or dispersing agents. Salts of these sulfonic acids, such as the ammonium salts, are useful as surface-active agents.

Throughout the specification and claims, any reference to parts, proportions and percentages refers to parts, proportions and percentages by weight unless otherwise specified.

Since it is obvious that many changes and modifications can be made in the above-described details without departing from the nature and spirit of the invention, it is to be understood that the invention is not to be limited to said details except as set forth in the appended claims.

I claim:

1. As a new composition of matter, a water-soluble copolymer having the formula

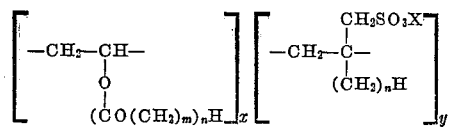

wherein $n$ is a cardinal number of zero to one, $m$ is a cardinal number of zero to three, X is a cation from the group consisting of alkali metal, alkaline earth metal and ammonium, and the ratio of $x$ to $y$ is between 65:35 and 97:3.

2. As a new composition of matter, a water-soluble copolymer having the formula

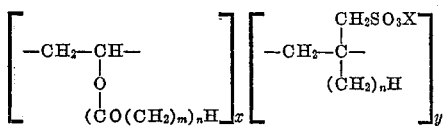

wherein $n$ is a cardinal number of zero to one, $m$ is a cardinal number of zero to three, X is a cation from the group consisting of alkali metal, alkaline earth metal and ammonium, and the molar ratio of $x$ to $y$ is between 80:20 and 95:5.

3. As a new composition of matter, a water-soluble copolymer of vinyl acetate and a 3–4 carbon atom allyl sulfonic acid salt in which the molar ratio of vinyl acetate groups to sulfonate groups is between 80:20 and 95:5.

4. As a new composition of matter, a water-soluble copolymer of vinyl alcohol and a 3–4 carbon atom allyl sulfonic acid salt in which the molar ratio of vinyl alcohol groups to sulfonate groups is between 80:20 and 95:5.

5. The process of forming copolymers which comprises reacting at reflux temperature 65 to 97 parts by weight of a vinyl ester of a carboxylic acid of 1–4 carbon atoms with 3 to 35 parts by weight of an allylic sulfonic acid salt of 3–4 carbon atoms in the presence of a polymerization catalyst taken from the class consisting of peroxy and azonitrile catalysts and a hydroxylated liquid solvent reaction medium substantially inert to the reactants.

6. The process of forming copolymers which comprises reacting at reflux temperature 65 to 97 parts by weight of a vinyl ester of a carboxylic acid of 1–4 carbon atoms with 3 to 35 parts by weight of an allylic sulfonic acid salt of 3–4 carbon atoms in the presence of a polymerization catalyst taken from the class consisting of peroxy and azonitrile catalysts and a hydroxylated liquid solvent reaction medium substantially inert to the reactants, isolating the copolymer and hydrolyzing the same in an alkaline medium.

7. The process of forming copolymers which comprises reacting at reflux temperature 65 to 97 parts by weight of vinyl acetate with 3 to 35 parts by weight of an allylic sulfonic acid salt of 3–4 carbon atoms in the presence of a polymerization catalyst taken from the class consisting of peroxy and azonitrile catalysts and a hydroxylated liquid solvent reaction medium substantially inert to the reactants.

8. The process of forming copolymers which comprises reacting at reflux temperature 65 to 97 parts by weight of vinyl acetate with 3 to 35 parts by weight of an allylic sulfonic acid salt of 3–4 carbon atoms in the presence of a polymerization catalyst taken from the class consisting of peroxy and azonitrile catalysts and a hydroxylated liquid solvent reaction medium substantially inert to the reactants, isolating the copolymer and hydrolyzing the same in an alkaline medium.

References Cited in the file of this patent

UNITED STATES PATENTS

| 2,601,256 | Bruson | June 24, 1952 |
| 2,667,469 | Sauer | Jan. 26, 1954 |

FOREIGN PATENTS

| 724,889 | Germany | Sept. 9, 1942 |